April 22, 1969        L. B. MORGAN        3,439,979

CALCULATOR MEANS FOR FITTING CONTACT LENSES

Filed June 16, 1966        Sheet 1 of 4

Loran B. Morgan
INVENTOR.

April 22, 1969 L. B. MORGAN 3,439,979
CALCULATOR MEANS FOR FITTING CONTACT LENSES
Filed June 16, 1966 Sheet 2 of 4

Loran B. Morgan
INVENTOR.

BY
Attorneys

April 22, 1969   L. B. MORGAN   3,439,979
CALCULATOR MEANS FOR FITTING CONTACT LENSES
Filed June 16, 1966   Sheet 3 of 4

Loran B. Morgan
INVENTOR.

BY

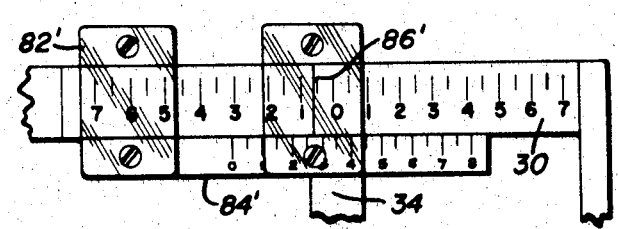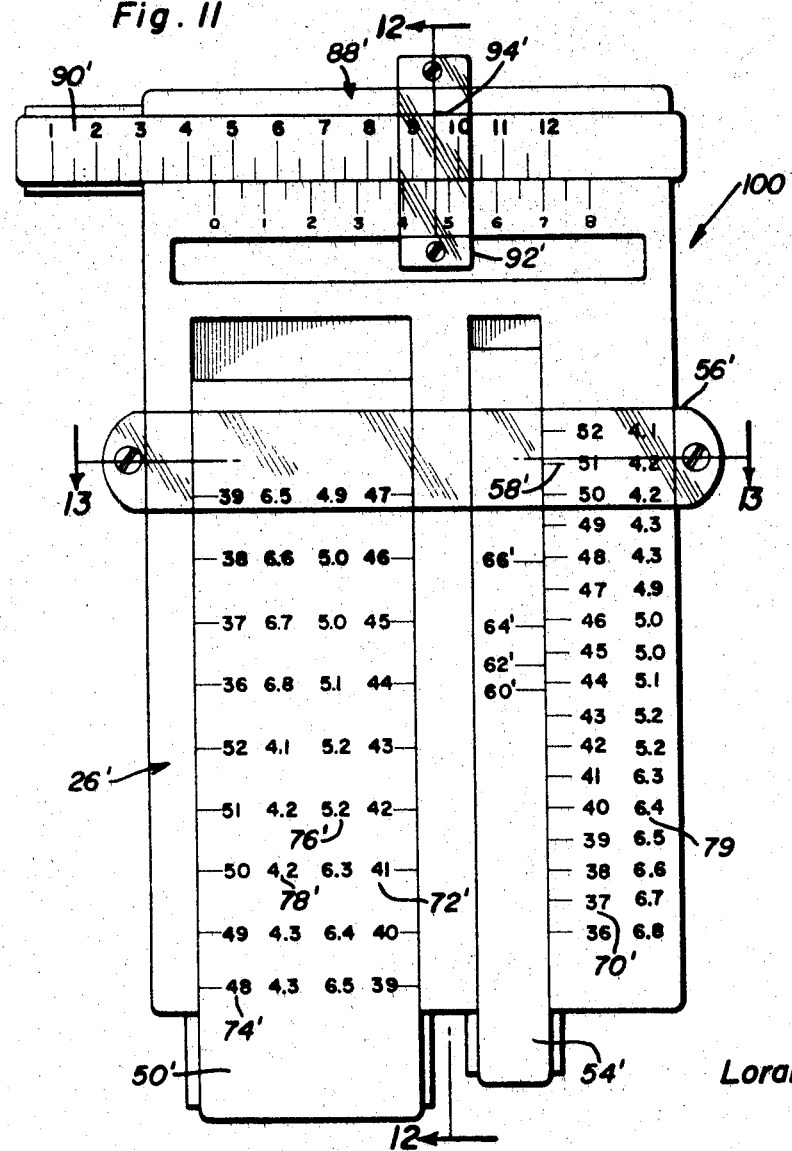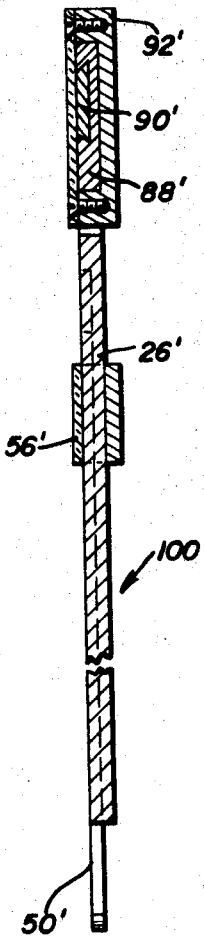

United States Patent Office 3,439,979
Patented Apr. 22, 1969

1

3,439,979
CALCULATOR MEANS FOR FITTING
CONTACT LENSES
Loran B. Morgan, 127 W. 21st Ave.,
Torrington, Wyo. 82240
Filed June 16, 1966, Ser. No. 558,070
Int. Cl. A61b 3/12
U.S. Cl. 351—6                                6 Claims

ABSTRACT OF THE DISCLOSURE

The lens curvature and diameter for contact lens fitted by the optical cap technique are calculated through use of attachments to and modifications of ophthalmometer and corneal topography survey instruments presently used for corneal measurements. The calculator attachments include movable scales appropriately calibrated to eliminate mental calculations when utilized in accordance with a prescribed procedure to determine the lens dimension.

This invention relates to the design of contact lenses by the optical cap technique and more particularly to calculator attachments for instruments presently used in connection with the fitting of contact lenses.

The present invention is concerned with corneal curvature measurements obtained through use of an ophthalmometer and a topography survey instrument attached thereto for surveying the limiting margin between the apex and the corneal curvature and the transitional zone of the cornea. A considerable amount of calculation is however necessary when using the aforementioned instruments in order to obtain the central posterior curve and the lens diameter for the proper contact lens to be fitted for the patient whose corneal curvature is being measured. It is therefore a primary object of the present invention to provide facilities associated with both the aforementioned ophthalmometer and survey attachment instrument whereby no mental calculation by the operator is necessary in order to determine both the central posterior curve and the lens diameter from the measurements obtained through the usual measuring procedures.

An additional object of the present invention is to provide a calculating assembly for an ophthalmometer also referred to as a keratometer through which corneal curvature is measured along a vertical and horizontal meridian in terms of diopters. Through use of the calculating assembly forming part of the present invention, the horizontal and vetrical diopter readings of the keratometer are directly converted into a central posterior curve reading and the summation of the chord length of the apical zone and ski factor corresponding to an oversize corneal apex. The ski factors are values between 1.5 and 3.0 determined from experience for each chordal length.

A still further object of the present invention in accordance with the foregoing object, is to provide slide rule calculating means associated with the topography surveying instrument attached to the keratometer so that the chord length and ski factor sum obtained from the calculator assembly may be added to the dimensions of an optical cap rim determined from the limiting margin measurements obtained from the topography survey instrument in order to calculate the lens diameter of the contact lens without requiring any mental calculation by the operator.

2

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 10 is a front elevational view similar to FIGURE 9 showing a modified form of slide rule assembly.

FIGURE 11 is a front elevational view of another form of calculating assembly to be utilized with the modified form of slide rule assembly shown in FIGURE 10.

FIGURES 12 and 13 are sectional views taken substantially through section lines 12—12 and 13—13 in FIGURE 11.

Figure 1:
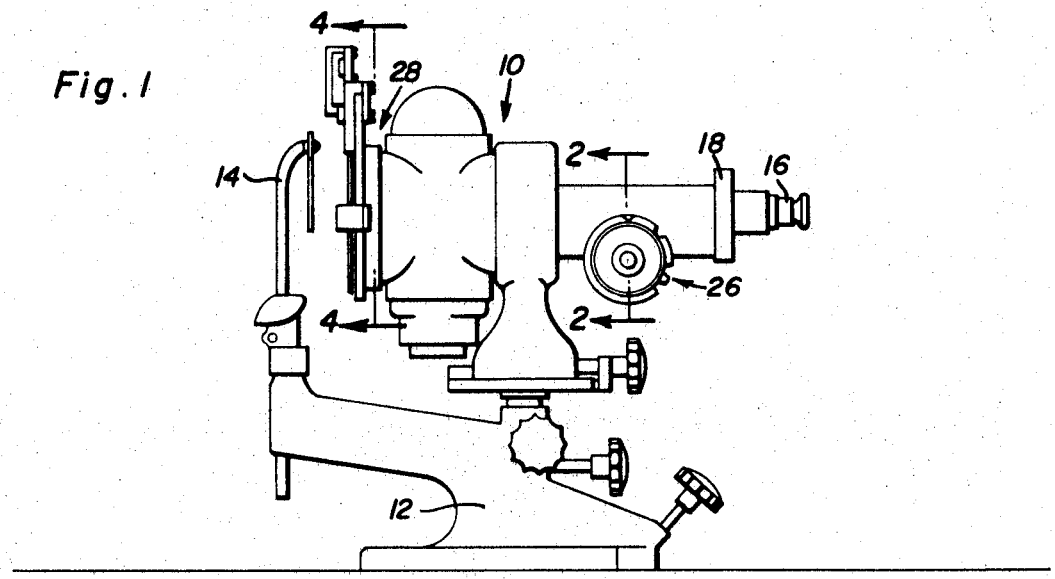
FIGURE 1 is a side elevational view of the instruments for measuring corneal curvature with the calculating attachments of the present invention installed thereon.

Referring now to the drawing in detail, it will be observed from FIG. 1 that the calculating attachments of the present invention are associated with an instrument for measuring corneal curvature in a vertical and horizontal meridian, this instrument being referred to as an ophthalmometer or keratometer such as disclosed in Patent No. 1,750,931 to Kellner et al., issued Mar. 18, 1930. The keratometer which is generally denoted in FIGURE 1 by reference numeral 10, is of a well known type having a base 12 which mounts a headrest 14 for a patient to properly position the eye so that the cornea curvature thereof may be measured by focusing a target image or mire as a virtual image behind the corneal surface being measured, the image being perceived by the operator through the eyepiece 16. The eyepiece 16 is positioned by means of the grip 18 so as to measure the corneal curvature along either a vertical or a horizontal meridian in terms of the refractive power to which the instrument is adjusted producing the virtual image aforementioned. Focus adjustment of the instrument is effected by means of calibrated measuring drums 20 and 22 as more clearly seen in FIGURE 2. Accordingly, both the drums 20 and 22 are provided with peripheral surfaces mounting scales providing readings in terms of diopters related to the radius of curvature of the surface being measured in accordance with accepted keratometric formulae. The measuring drum 20 provides readings corresponding to measurements made in the vertical meridian while the measuring drum 22 provides readings corresponding to measurements made in the horizontal meridian. In accordance with the present invention however, the horizontal measuring drum 22 and the adjusting shaft 24 to which it is attached, are modified so as to mount the calculating assembly generally referred to by reference numeral 26.

Figure 4:
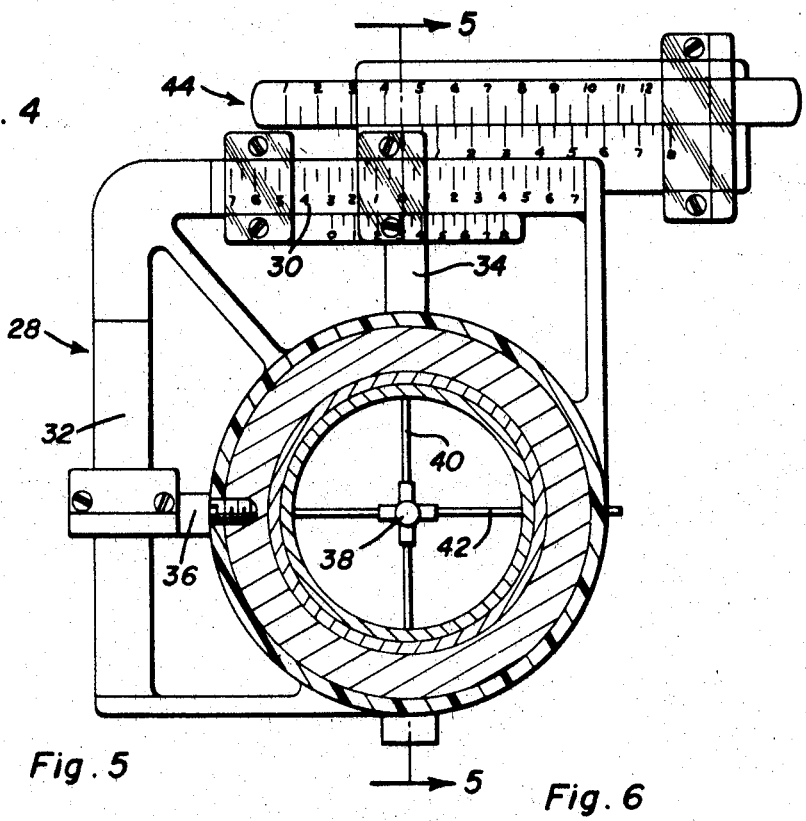
FIGURE 4 is an enlarged transverse sectional view taken substantially through a plane indicated by section line 4—4 in FIGURE 1.
Figure 5:
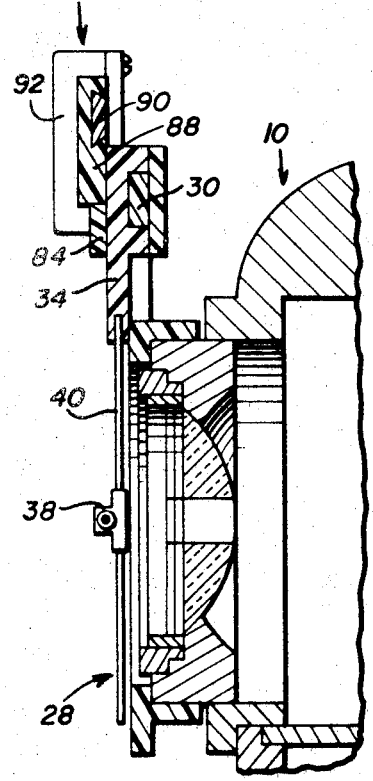
FIGURE 5 is a partial sectional view taken substantially through a plane indicated by section line 5—5 in FIGURE 4.

The measurements made of the corneal curvature by means of the keratometer 10 are based upon fixation of the patient's eye on the optical center of the keratometer so that the optical axis of the instrument is aligned with the visual axis of the eye being measured. In order to survey the quadrants of the corneal surface and locate the limiting margins, the visual center is displaced from the optical axis of the kerometer by means of the topography survey instrument generally referred to by reference numeral 28 as shown in FIGURES 1, 4 and 5. The instrument 28 is mounted on the end of the keratometer opposite the eyepiece 16 and includes a horizontal decentration scale member 30 and a vertical decentration scale member 32. The decentration scale members respectively mount slider assemblies 34 and 36 capable of horizontally and vertically shifting a fixation light assembly 38 by means of the electrically conductive rods 40 and 42. In this manner, the visual center may be decentered from the optical axis of the keratometer and the amount of horizontal and vertical decentration measured on the decentration scale members 30 and 32. The instrument 28 does not form part of the present invention, except that it mounts and cooperates with a slide rule calculating assembly generally denoted by reference numeral 44 through which values obtained from the calculating assembly 26 are combined with readings obtained from the instrument 28 to calculate the lens diameter of the contact lens being fitted to the corneal curvature measured by the keratometer 10.

Figure 2:
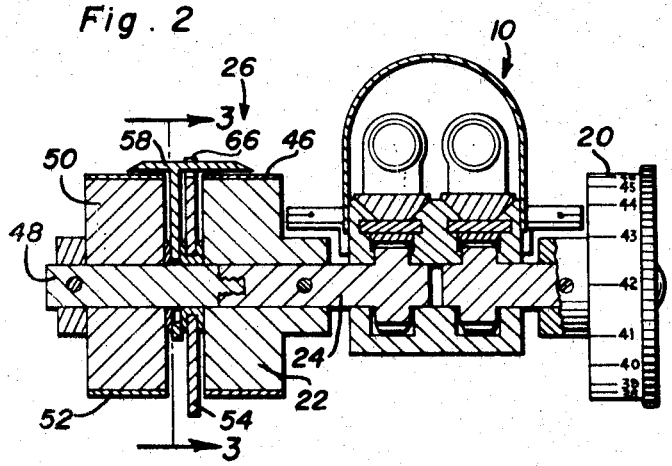
FIGURE 2 is an enlarged transverse sectional view taken substantially through a plane indicated by section line 2—2 in FIGURE 1 showing the calculating assembly attached to the horizontal measuring drum of the instrument.
Figure 3:
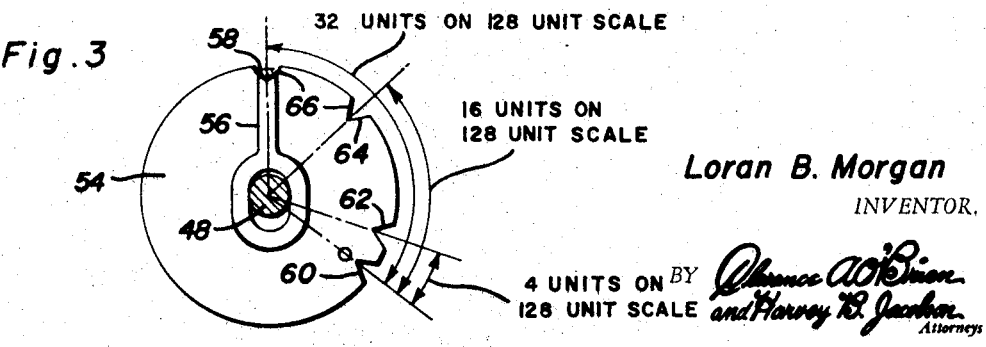
FIGURE 3 is a sectional view taken substantially through a plane indicated by section line 3—3 in FIGURE 2.

The construction and use of the keratometer 10 and the topography survey intsrument 28 are well known so that further description thereof is deemed unnecessary. The contribution of the present invention however resides in the calculating assembly 26 and the slide rule assembly 44 aforementioned. As shown in FIGURES 2 and 3, the modified horizonttal measuring drum 22 includes a peripheral scale surface 46 which is displayed by rotation of the drum. An extension shaft 48 is secured in any suitable fashion to the adjusting shaft 24 so as to loosely mount thereon an auxiliary drum 50 of diameter equal to that of the drum 22 and having a scale surface 52 mounted thereon. The auxiliary drum 50 is axially spaced from the drum 22 so as to accommodate the loose rotatable mounting of a positioning disc member 54 on the shaft extension 48 and an indicator member 56 having an axially extending pointer portion 58 overlying the scale surfaces 46 and 52 of the drums 22 and 50. Also formed on the positioning disc member 54, are a plurality of notches 60, 62, 64 and 66 within which the pointer portion 58 may be seated. The pointer portion 58 of the indicator is therefore received in a selected one of the notches in accordance with certain rules to be hereafter explained.

Figure 7:
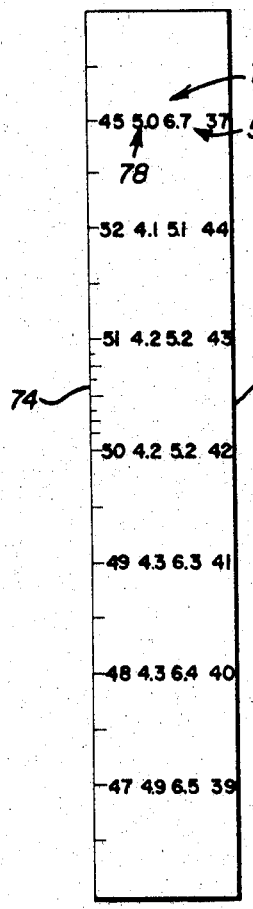
FIGURE 7 is a plan view of the scale on an auxiliary drum associated with the horizontal measuring drum.
Figure 8:
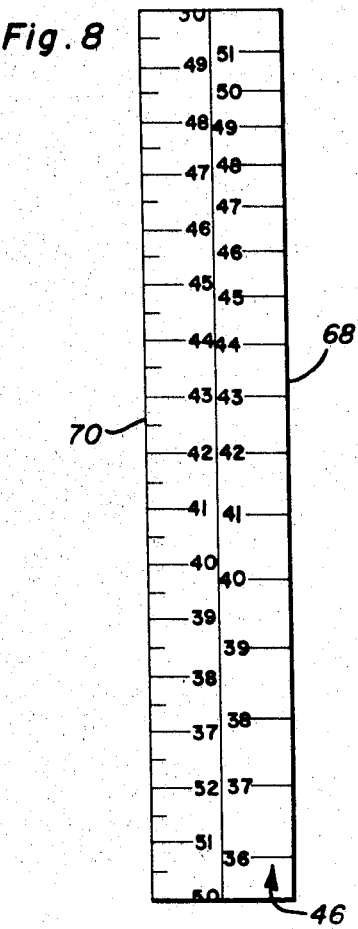
FIGURE 8 is a plan view of the scale mounted on the horizontal measuring drum.

Referring now to FIGURES 7 and 8, it will be observed that the cylindrical scale surface 46 on the horizontal measuring drum 22 is laid out flat and includes an inner scale edge 68 calibrated in diopter units between 36 and 52 (cut along diopter 52 as laid out in FIGURE 8) identical to the calibration of the horizontal measuring drum of a conventional keratometer or identical to the calibration of the scale on the vertical measuring drum 20. The axially outer edge 70 of the scale surface 46 on the other hand (cut along diopter 50) is divided into 128 equal units, with eight units representing one diopter. The inner and outer edges 72 and 74 of the scale surface 52 associated with the auxiliary drum 50 form an expanded scale so that the scale along the edge 72 (cut along diopter 38 as laid out in FIGURE 7) is divided into equal units between 36 and 44 diopters whereas the scale along the edge 74 (cut along diopter 46) is divided into equal units of the same scale continuing from 44 diopters to 52 diopters. Since each diopter reading corresponds to a chordal length of curvature in accordance with accepted keratometric formulae, each diopter reading will have a corresponding chord length. Also, the central posterior curve calculated from the curvature readings will have a corresponding chord length and an oversize or ski factor based upon optimum dimensional relationships found from experience. Thus, the sum of the chord length and ski factor associated with each diopter value on the scales along the edges 72 and 74 is recorded on the scale surface 52 as a split scale 76–78 extending between 6.8 at the 36 diopter end of the scale along edge 72 and 4.1 at the 52 diopter end of the scale along edge 74 as shown in FIGURE 7.

The central posterior curve of the contact lens is obtained from the diopter readings of the keratometer in the vertical and horizontal meridians as read on the usual scales of the vertical and horizontal measuring drums 20 and 22 in accordance with certain rules. If the difference between the vertical and horizontal diopter readings of the keratometer is equal to or less than one, the central posterior curve in terms of diopters is equal to the diopter reading of lower value plus 0.50 D (diopters). If the difference between the vertical and horizontal diopter readings is equal to or greater than four, then the central posterior curve is equal to the lower diopter reading plus 2.00 D. Should the difference between the vertical and horizontal diopter readings lie between one and four, then the central posterior curve would be the mean value or the difference between the vertical and horizontal diopter readings divided by two, plus the lower diopter reading. In order to convert the horizontal and vertical diopter readings of the keratometer into the central posterior curve value in accordance with the foregoing rules, the notch 62 on the positioning disc member 54 is angularly spaced from the zero notch 60 by a circumferential distance equal to four units along the scale edge 70 representing therefore, the addition of 0.50 D to the lower of the two diopter readings obtained. The notch 64 on the other hand is circumferentially spaced from the zero notch 60 by 16 units representing 2.00 D along the scale edge 70 to be added to the lower of the two diopter readings should the difference between the vertical and horizontal diopter readings be equal to or greater than four as aforementioned. Finally, the notch 66 is circumferentially spaced from the zero notch 60 by 32 units representing a difference of 4 D between the vertical and horizontal readings. It will therefore become apparent that positioning of the indicator 56 within a selected one of the notches in the positioning disc member 54 may be effected in order to comply with the appropriate rule for converting the diopter readings into a central posterior curve reading on the scale edge 70 underlying the pointer portion 58 of the indicator. To obtain the mean value between the vertical and horizontal diopter readings, the lower of the two readings on both the scale edge 70 and 72 or 74 are aligned below the pointer 58 which is then shifted along the scale edge 70 to the higher diopter reading. The mean value is then read on either scale edge 72 or 74 below the pointer. Thus, the calculating assembly 26 will not only convert the diopter readings into the central posterior curve value but will also provide a value on the intermediate split scales 76 and 78 of the scale surface 52 representing the summation of the chord length and ski factor associated with each particular diopter value of the central posterior curve. The relationships utilized for this purpose are shown for example on the following table.

TABLE

| Diopter | Chord (mm.) | Ski factor |
|---|---|---|
| 36 | 3.800 | 3.0 |
| 37 | 3.725 | 3.0 |
| 38 | 3.650 | 3.0 |
| 39 | 3.575 | 3.0 |
| 40 | 3.550 | 3.0 |
| 41 | 3.425 | 3.0 |
| 42 | 3.350 | 2.0 |
| 43 | 3.275 | 2.0 |
| 44 | 3.200 | 2.0 |
| 45 | 3.125 | 2.0 |
| 46 | 3.050 | 2.0 |
| 47 | 2.975 | 2.0 |
| 48 | 2.900 | 1.5 |
| 49 | 2.825 | 1.5 |
| 50 | 2.750 | 1.5 |
| 51 | 2.675 | 1.5 |
| 52 | 2.600 | 1.5 |

It will of course be appreciated that other relationships between the central posterior curve and ski factor may be utilized depending upon experience in order to obtain the scales 76 and 78 on the scale surface 52. Also, the notches formed on the positioning disc 54 may be dimensionally varied in accordance with other rules that may be adopted in order to convert the horizontal and vertical diopter readings into a central posterior curve value.

Figure 6:
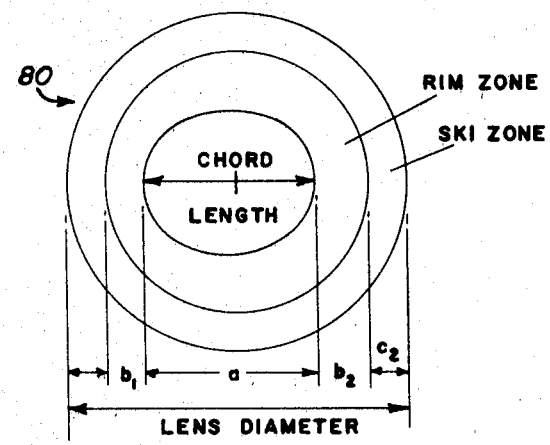
FIGURE 6 is a diagram illustrating the relationships between the factors from which lens diameter is determined when fitting contact lenses in accordance with the optical cap technique.
Figure 9:
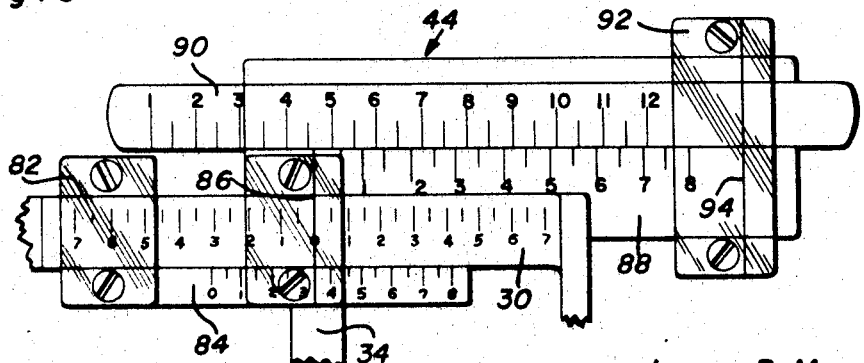
FIGURE 9 is a front elevational view of the slide rule assembly associated with the topography survey instrument mounted on the keratometer.

Referring now to FIGURE 6, it will be observed that the lens diameter represented by circle 80 is related to the interrelated chord length (a) and ski factor (c) and a rim dimension $(b_1+b_2)$ obtained from topographical survey of the corneal surface by means of the keratometer 10 utilizing the instrument 28. Thus, by adding the sum of the chord length and ski factor to a rim dimension obtained through use of the instrument 28, the lens diameter of the contact lens may be obtained. Toward this end, the slide rule assembly 44 is mounted on the instrument 28 as more clearly seen in FIGURES 4, 5 and 9. The slide rule assembly includes a separate slider 82 slidably mounted on the horizontal decentration scale member 30 so that it may abut the fixation slider 34 for movement thereof in one direction. Secured to and movable with the slider 82 is a lower scale member 84 having scale units thereon equal to those on the decentration scale member 30. The scale indicia on the lower scale member is also arranged to underlie the hairline 86 on the fixation slider 34. Secured to the fixation slider 34 for movement therewith, is a second scale member 88 provided with scale indicia having equal units. A slide rule member 90 is slidably mounted within the scale member 88 also provided with scale units equal to those on the scale member 88. An indicator slider 92 is slidably mounted on the scale member 88 including a hairline 94 overlying the scales on the scale member 88 and the slide rule member 90. It will become apparent then, that the fixation slider 34 may be displaced in one direction by means of the auxiliary slider 82 until a limiting margin is located on the decentration scale member 30 after which the auxiliary slider 82 is held stationary and movement of the fixation slider 34 continued in the same direction to locate the other limiting margin in the same meridian. The hairline 86 on the fixation slider will then overlie a value on the lower scale member 84 representing the sum of the linear length of the surrounding corneal rim portion of either the nasal and temporal sides or the inferior and superior sides. The larger of the summations so obtained may be added to the value obtained from the calculating assembly 26 as aforementioned by performing an addition operation. This is accomplished by displacing the slide rule member 90 to a position aligning the value obtained from the lower scale member 84 with the hairline 86 on the fixation slider 34 and then moving the slider 92 to a position on the scale member 88 corresponding to the value obtained from the calculating assembly 26 in order to read the final lens diameter on the slide rule member 90 under the hairline 94.

From the foregoing description, the construction and utility of the calculating attachments of the present invention will be apparent The procedure utilized may be summarized as follows: the patient, the keratometer 10 and instrument 28 are arranged in the usual fashion for corneal curvature measurements. The horizontal measuring drum 22 is then rotated until the mires or targets perceived by the operator indicate proper focus corresponding to a horizontal diopter reading on the horizontal measuring drum 22. The pointer portion 58 of the indicator 56 is then placed in the zero notch 60 of the positioning disc 54 and rotated together therewith so as to lie over the horizontal diopter reading of the scale adjacent the outer edge 70 of the horizontal measuring drum 22.

The fixation light assembly 38 and slider 34 of the instrument 28 are then moved to the patient's right until the transitional zone of the corneal surface is being mirrored. The auxiliary slider 82 is now moved into abutment with the fixation slider 34 so as to displace it in the opposite direction toward the visual center until the limiting margin is located when the operator perceives the superimposition of the plus mires. The slider 82 is then left in this position and the fixation slider moved in the same direction until the temporal limiting margin is similarly located. The hairline 86 on the fixation slider 34 will then indicate the sum of the nasal and temporal decentration on the scale of the lower scale member 84. The slide rule member 90 is then moved to a position aligning a value thereon with the hairline 86 corresponding to the value obtained from the lower scale member 84.

After the corneal curvature has been surveyed in the horizontal meridian, the keratometer is rotated to the position for measuring corneal curvature along the vertical meridian by known procedures now in use. The vertical quadrants of the corneal curvature are then surveyed through the instrument 28 by excursions of the fixation slider and light assembly 38 and the sum of the inferior and superior decentrations obtained on the lower scale member in the same manner as described in connection with the summation of the nasal and temporal decentrations. If the sum of the inferior and superior decentrations is greater than that of the nasal and temporal decentrations, the slide rule member 90 is repositioned in accordance with this larger sum. The slide rule assembly 44 is now in condition for adding the rim dimension to the chord length and ski factor in order to obtain the final lens diameter.

The central posterior curve is determined after corneal curvature measurement is obtained in the vertical meridian by repositioning the pointer portion 58 over the scale along the edge 70 of the scale surface 46 corresponding to the lower of the two diopter readings. The pointer is now shifted from the zero notch 60 to one of the other three notches 62, 64 and 66 according to the rule applicable. If the difference between the diopter readings is less than one, the pointer 58 is shifted to the notch 62 is order to obtain the central posterior curve value on the scale surface 46 along the edge 70. If the difference between the diopter readings is more than four, the pointer is shifted to notch 64. Should the difference between the diopter readings lie between one and four, the drum 50 is rotated in order to align the lower diopter value on the scale along edge 72 or 74 with the pointer portion 58 and the pointer then moved to the higher diopter reading on the scale edge 70 of the measuring drum 22 so as to obtain the mean value of the diopter readings along one of the scale edges 72 and 74 of the auxiliary drum 50. The corresponding values read on one of the intermediate scales 76 and 78 of the auxiliary drum will indicate the sum of the chord length and ski factor associated with the corresponding central posterior curve value. This value is then transferred to the slide rule assembly 44 and added to the larger sum of the decentrations as aforementioned.

The same calculating principles as hereinbefore described may be utilized through a somewhat simpler procedure by means of a calculator assembly 100 as shown in FIGURES 11, 12 and 13. In such case, the topography survey instrument 28 mounts a less complex slide rule assembly as shown in FIGURE 10 while the keratometer 10 is in no way modified by attachment of assembly 26 as shown in FIGURES 1, 2 and 3, since the calculating assembly 100 replaces the calculating assembly 26.

The summation of the lineal length of the surrounding corneal rim portion of the nasal and temporal sides or the inferior and superior sides are obtained from the excursions of the fixation slider 34 utilizing the slider 82', scale member 84' and hairline 86' as shown in FIGURE 10 as hereinbefore described in connection with the slider 82, scale member 84 and hairline indicator 86 of the slide rule assembly 44. The larger of the summations so obtained is then added by means of the slide rule portion 88' of the calculating assembly 100 with a value obtained from the slide rule portion 26'. The slide rule portion 88' therefore includes a slide rule member 90' bearing a scale identical to the scale shown in FIGURE 9 for the slide rule member 90 cooperating with scale units identical to that shown for the scale member 88 in FIGURE 9. Also associated with the slide rule portion 88' is a slider 92' having a hairline indicator 94' performing the same function as described in connection with the slider 92 of the slide rule assembly 44.

The calculating slide rule portion 26' of the calculator assembly 100 includes a stationary scale member 70' identical to the scale disposed along the edge 70 as shown in FIGURE 8 in connection with the horizontal measuring drum. Thus, the scale 70' records diopter readings between 36 and 52 as equally spaced units aligned with the corresponding summations of chord length and the "ski" factor along scale 79. The hairline indicator 58' on the slider 56' movable in a direction perpendicular to the slider 92', will therefore indicate the summation value along scale 79 corresponding to a diopter reading on scale 70' to which the slider is moved. This is the summation value obtained from the calculating slide rule portion 26' which is to be transferred to the slide rule portion 88' as aforementioned in order to obtain the lens diameter.

The slide member 54' corresponds to the positioning disc member 54 previously described in connection with the calculating assembly 26 and therefore mounts position indexing marks 62', 64' and 66' with which the slider hairline 58' is aligned after the zero mark 60' is aligned with a diopter reading on the scale 70'. The index mark with which the hairline 58' is aligned will depend upon the rule applicable as hereinbefore explained. The index mark 62' is therefore spaced from the zero mark 60' by four of the 128 equal units into which the scale 70' is divided while the index marks 64' and 66' are respectively spaced 16 units and 32 units along the scale 70' from the zero mark. This spacing of the index marks on scale 70' corresponds to the angular spacing of the notches on disc member 54 as illustrated in FIGURE 3. It will be apparent therefore, that the slider 56' is aligned with either the marks 62' or 64' in order to obtain a reading value on the scale 79 underlying the hairline 58' corresponding to a diopter reading transferred to the scale 70' from the horizontal measuring drum 22 of the keratometer.

The slide rule member 50' replaces the auxiliary drum 50 hereinbefore described and therefore underlies the hairline pointer 58' of the slider 56'. The slide rule member 50' therefore mounts expanded diopeter reading scales 72' and 74' as well as the split scales 76' and 78' constituting an expansion of the scale 79. Thus, the slide rule member 50' may be utilized to obtain a mean value between horizontal and vertical diopter readings should the difference therebetween exceed four as herinbefore described in connection with the auxiliary drum 50. It will be appreciated therefore that the calculating procedure is simplified by eliminating any attachment to the keratometer and reducing the number of attachments to the topography survey instrument by transferring the associated functions to the calculating assembly 100.

As a result of the foregoing procedure, a considerable amount of time is saved and error avoided in connection with the calculation of the central posterior curve and lens diameter of contact lenses. It should be appreciated however, that the informaion so calculated must still be supplemented by further examination, trial fitting, etc. before contact lenses may be prescribed. Further, the calculating attachments described do not interfere with any other use of the keratometer and topographic survey instrument attached thereto as for example the location of keratometric "limbus," study of 1.0 millimeter beyond the limiting margin, simple study of corneal astigmatism, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an ophthalmometer for measuring corneal curvature along horizontal and vertical meridians having focus adjusting drums and a topography survey attachment having horizontal and vertical decentration measuring scales on which fixation moving sliders are mounted, apparatus for calculating the central posterior curve and the diameter of a corneal contact lens comprising, means movably mounted by one of said focus adjusting drums for registering the chordial length of an oversize corneal apex corresponding to readings obtained through said focus adjusting drums, and slide rule means mounted on the topography survey attachment for adding said chordal length of the oversize corneal apex to marginal dimensions of a transitional zone registered by the fixation sliders on the decentration scales.

2. The combination of claim 1 wherein said movably mounted means comprises, an auxiliary drum rotatable relative to said one of the focus adjusting drums about a common axis, a positioning disc rotatably mounted between the latter two drums, and indicator means angularly positioned by said positioning disc relative to said drums for correlating scales on the drums with each other.

3. The combination of claim 2 wherein said slide rule means comprises, a first scale member slidably mounted on one of the decentration scales and displaceable in one direction by the fixation slider, a second scale member fixedly mounted by the fixation slider for movement therewith, a third scale member slidably mounted by the second scale member and an auxiliary slider mounted by the second scale member overlying the third scale member.

4. The combination of claim 1 wherein said slide rule means comprises, a first scale member slidably mounted on one of the decentration scales and displaceable in one direction by the fixation slider, a second scale member fixedly mounted by the fixation slider for movement therewith, a third scale member slidably mounted by the second scale member and an auxiliary slider mounted by the second scale mmeber overlying the third scale member.

5. In combination with an ophthalmometer for measuring corneal curvature along horizontal and vertical meridians having focus adjusting drums, means for calculating the central posterior curve of a corneal contact lens comprising, an auxiliary drum rotatable relative to one of the focus adjusting drums about a common axis, a positioning disc rotatably mounted between the latter two drums, and indicator means angularly positioned by said positioning disc relative to said drums for correlating scales on the drums with each other.

6. In combination with a topography attachment having horizontal and vertical decentration measuring scales on which fixation moving sliders are mounted, apparatus for calculating the diameter of a corneal contact lens comprising, a first scale member slidably mounted on one of the decentration scales and dsiplaceable in one direction by the fixation slider, a second scale member fixedly mounted by the fixation slider for movement therewith, a third scale member slidably mounted by the second scale member and an auxiliary slider by the second scale member overlying the third scale member.

References Cited

UNITED STATES PATENTS 1,802,603  4/1931  Herm _____ 235—70 X

OTHER REFERENCES

Louis J. Girard et al.; Corneal Contact Lenses, The C. V. Mosby Company, copyright 1964, pp. 97–100 (copy in Group 259).

DAVID SCHONBERG, Primary Examiner.
P. A. SACHER, Assistant Examiner.

U.S. Cl. X.R.

235—70; 351—40